United States Patent [19]
Muto

[11] Patent Number: 6,044,117
[45] Date of Patent: Mar. 28, 2000

[54] PEAK CLIPPING CIRCUIT PROVIDED IN A QUADRATURE MODULATOR AND A METHOD OF CLIPPING PEAK LEVELS OF IN-PHASE AND QUADRATURE SIGNALS

[75] Inventor: Hiroyasu Muto, Saitama, Japan

[73] Assignee: NEC Corporation, Tokyo, Japan

[21] Appl. No.: 09/062,581

[22] Filed: Apr. 20, 1998

[30] Foreign Application Priority Data

Apr. 21, 1997 [JP] Japan ................................. 9-103614

[51] Int. Cl.⁷ ............................. H04L 27/04; H04L 27/20
[52] U.S. Cl. .......................... 375/295; 375/298; 375/308
[58] Field of Search .................................. 375/295, 298, 375/308, 261, 279, 280; 332/100, 103

[56] References Cited

U.S. PATENT DOCUMENTS

| | | | |
|---|---|---|---|
| 5,751,774 | 5/1998 | Wang | 375/298 |
| 5,818,875 | 10/1998 | Suzuki et al. | 375/298 |

FOREIGN PATENT DOCUMENTS

| | | |
|---|---|---|
| 3-157033 | 7/1991 | Japan . |
| 7-77433 | 1/1995 | Japan . |
| 7-321861 | 12/1995 | Japan . |
| 8-191456 | 7/1996 | Japan . |

*Primary Examiner*—Tesfaldet Bocure
*Attorney, Agent, or Firm*—McGinn & Gibb, P.C.

[57] ABSTRACT

In order to clip the levels of an incoming in-phase and quadrature signals, a comparator receives the in-phase signal, a clipping level, and an inverted clipping level. The comparator compares the level of the in-phase signal with each of the clipping level and the inverted clipping level, and generates a comparison result. A selector, in response to the comparison result, allows the in-phase signal to pass therethrough when the level of the in-phase signal exceeds the inverted clipping level and less than the clipping level, selecting the inverted clipping level when the level of the in-phase signal is less than the inverted clipping level, and selecting the clipping level when the level of the in-phase signal exceeds the clipping level. On the other hand, the level of the quadrature signal is limited using another comparator and selector in exactly the same manner as mentioned above.

18 Claims, 4 Drawing Sheets

SIGNAL SPACE DIAGRAM OF QPSK

PEAK CLIPPING CIRCUIT PROVIDED IN A QUADRATURE MODULATOR AND A METHOD OF CLIPPING PEAK LEVELS OF IN-PHASE AND QUADRATURE SIGNALS

BACKGROUND OF THE INVENTION

1. Field of the Invention

The present invention relates to a peak clipping circuit, and more specifically to such a circuit which is provided in a quadrature modulator of a transmitter which is, for example, provided in a base station of a mobile communications system. Still more specifically, the present invention relates to a method of limiting peak levels of in-phase (I) and quadrature (Q) signals. The present invention is well suited for use in, for example, BPSK (binary phase shift keying), QPSK (quadratype phase shift keying), 16-QAM (quadrature amplitude modulation), etc.

2. Description of the Related Art

As is well known in the art, in a mobile communications system such as CDMA (code division multiple access), a plurality of user's signals are multiplexed and then transmitted simultaneously from a base station at the same frequency. As the number of multiplexed subscriber's signals increases, a peak level of the multiplexed signal increases accordingly. Even in such a case, it is necessary to amplify the multiplexed signal without distortion in order to suppress spreading of signal spectrum. One approach to this problem is to increase a maximum output of an amplifier (e.g., power amplifier) for amplifying the multiplexed signal. However, this approach has encountered the drawbacks that the transmitter itself becomes bulky and the power consumption undesirably increases. In order to avoid such drawbacks, it is conceivable to adaptively control in-phase and quadrature signals in response to a control signal which indicates the number of signals multiplexed (viz., actually transmitted).

Before turning to the present invention, it is deemed advantageous to briefly describe, with reference to FIGS. 1 and 2, a conventional technique to limit the in-phase and quadrature signals at a modulator provided in a transmitter.

FIG. 1 is a signal space diagram showing a QPSK modulation scheme. This diagram is well known in the art and thus a description thereof will be omitted for brevity.

FIG. 2 is a signal space diagram for describing the conventional technique for limiting levels of an in-phase and quadrature signals. Assuming that levels of an incoming in-phase and quadrature signals are respectively denoted by Ix and Qx. The amplitude or distance of the point (Ix, Qx) from an original point, which is represented by $(Ix^2+Qx^2)^{1/2}$, is first calculated. Subsequently, the amplitude thus obtained is compared with a clipping level A defined by In and Qn. If the amplitude $(Ix^2+Qx^2)^{1/2}$ is larger than the clipping level A, each of the levels of the signals Ix and Qx is multiplied by $A/(Ix^2+Qx^2)^{1/2}$. Thus, the level limitation is carried out. However, with this conventional technique, a plurality of multipliers is undesirably needed with the result of complex and bulky hardware.

SUMMARY OF THE INVENTION

It is therefore an object of the present invention to provide a peak clipping circuit for limiting levels of in-phase and quadrature signals without any multiplication.

Another object of the present invention is to provide a method of effectively clipping the levels of in-phase and quadrature signals without need for any multiplication.

These objects are fulfilled by a technique wherein in order to clip the levels of an incoming in-phase and quadrature signals, a comparator receives the in-phase signal, a clipping level, and an inverted clipping level. The comparator compares the level of the in-phase signal with each of the clipping level and the inverted clipping level, and generates a comparison result. A selector, in response to the comparison result, allows the in-phase signal to pass therethrough when the level of the in-phase signal exceeds the inverted clipping level and less than the clipping level, selecting the inverted clipping level when the level of the in-phase signal is less than the inverted clipping level, and selecting the clipping level when the level of the in-phase signal exceeds the clipping level. On the other hand, the level of the quadrature signal is limited using another comparator and selector in exactly the same manner as mentioned above.

One aspect of the present invention resides in a peak clipping circuit provided in a modulator of a signal transmitter, the peak clipping circuit limiting a level of an incoming in-phase signal and a level of an incoming quadrature signal, comprising: a clipping level generator for generating a clipping level; an inverter, coupled to receive the clipping level, for generating an inverted clipping level; a first comparator receiving the in-phase signal, the clipping level, and the inverted clipping level, the first comparator comparing a level of the in-phase signal with each of the clipping level and the inverted clipping level, and generating a first comparison result; a second comparator receiving the quadrature signal, the clipping level, and the inverted clipping level, the second comparator comparing a level of the quadrature signal with each of levels of the clipping level and the inverted clipping level, and generating a second comparison result; and signal selecting means for responding to the first comparison result and selecting one of the in-phase signal, the clipping level, and the inverted clipping level and for responding to the second comparison result and selecting one of the quadrature signal, the clipping level, and the inverted clipping level.

Another aspect of the present invention resides in a method of clipping a level of an incoming in-phase signal and a level of an incoming quadrature signal in a modulator of a signal transmitter, comprising the steps of: generating a clipping level; receiving the clipping level and generating an inverted clipping level; comparing a level of the in-phase signal with the clipping level and the inverted clipping level, and generating a comparison result; selecting, in response to the comparison result, the in-phase signal when an absolute level of the in-phase signal does not exceed the clipping level, and selecting the clipping level after adding thereto a sign which is identical with the in-phase signal when the absolute level of the in-phase signal exceeds the clipping level; comparing a level of the quadrature signal with the clipping level and the inverted clipping level, and generating a comparison result; and selecting, in response to the comparison result, the quadrature signal when an absolute level of the quadrature signal does not exceed the clipping level, and selecting the clipping level after adding thereto a sign which is identical with the quadrature signal when the absolute level of the quadrature signal exceeds the clipping level.

BRIEF DESCRIPTION OF THE DRAWINGS

The features and advantages of the present invention will become more clearly appreciated from the following description taken in conjunction with the accompanying drawings in which like member or elements are denoted by like reference numerals and in which.

DETAILED DESCRIPTION OF THE PREFERRED EMBODIMENTS

A preferred embodiment of the present invention will be described, with reference to FIGS. 3–6, when applied to a CDMA mobile communications system. It should be noted, however, that the application of the present invention to such a particular case is exemplary and is in no way limited thereto. In other words, the present invention is applicable to a circuit wherein the peak level of each of an I (in-phase) and Q (quadrature) coordinates is clipped or limited. More specifically, the peak clipping circuit embodying the present invention can be utilized in technical fields other than a mobile communications system.

Figure 1:
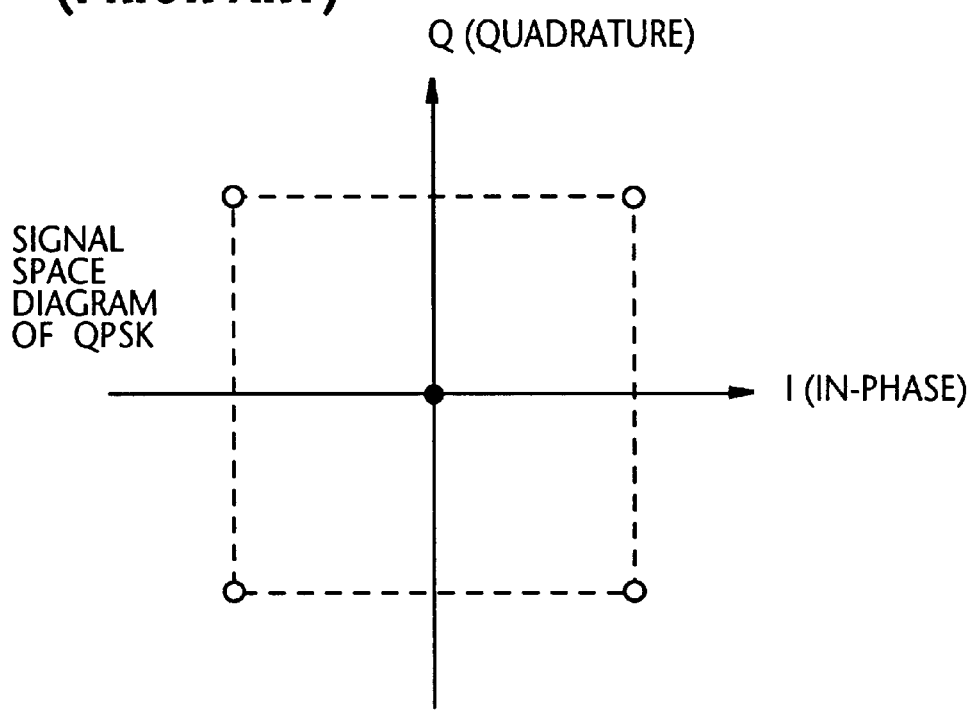
FIG. 1 is a signal space diagram of QPSK which is well known in the art.
Figure 2:
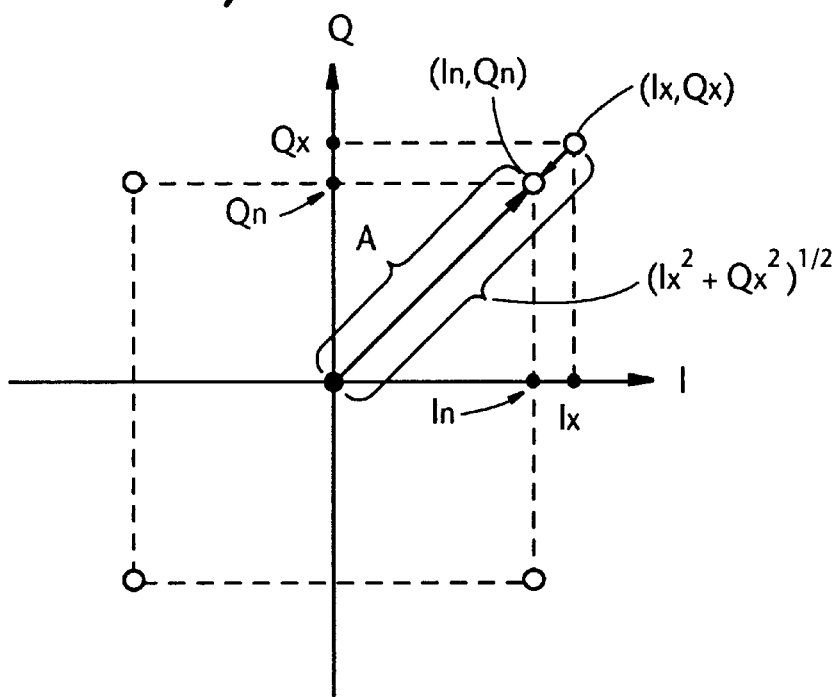
FIG. 2 is a space diagram of QPSK for discussing conventional peak clipping operations, having been referred to in the opening paragraphs.
Figure 3:
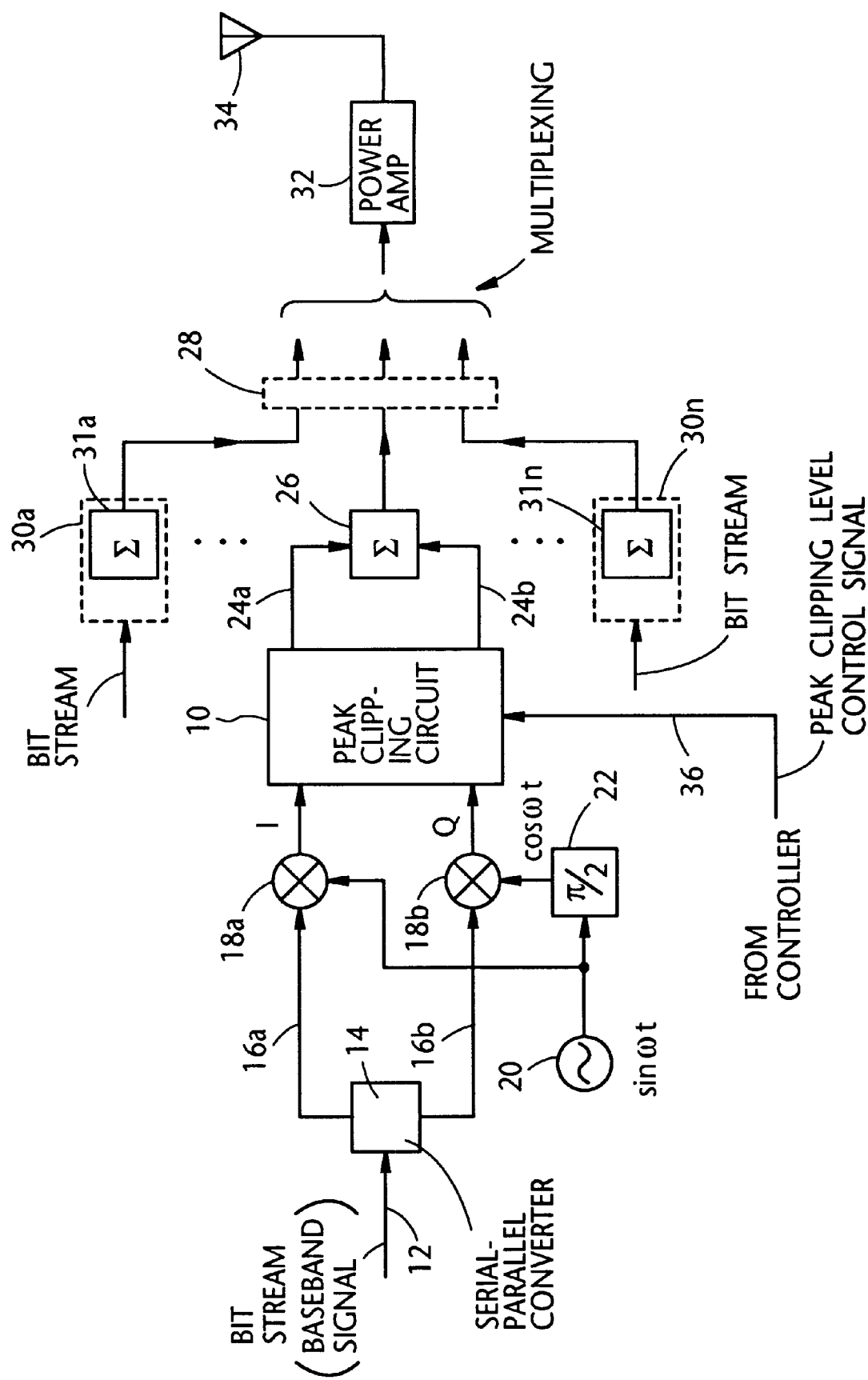
FIG. 3 is a QPSK modulator wherein a peak clipping circuit embodying the present invention is provided, having been referred to in the opening paragraphs.

FIG. 3 schematically shows a part of a transmitter in block diagram form, which is provided in a base station in a CDMA mobile communications system by way of example. The present invention is concerned with a peak clipping circuit 10 which is provided in a QPSK modulator in this particular case. The remaining functional blocks of FIG. 3 are conventional ones and accordingly, they are briefly described for the sake of simplifying the disclosure.

In FIG. 3, a bit stream (viz., base band signal) 12, which has been produced by sampling and quantizing an audio signal (for example), is applied to a conventional serial-parallel converter 14. Two bit streams 16a and 16b, outputted from the converter 14, are respectively applied to multipliers 18a and 18b. A signal generator 20 generates a sine wave signal (for example) which is directly applied to the multiplier 18a and which is phase shifted by $\pi/2$ (viz., changed to a cosine wave signal) at a phase shifter 22 and then applied to the multiplier 18b. Thus, an I (in-phase) signal and Q(quadrature) signal are generated, which are fed to the peak clipping circuit 10 which will be described in detail with reference to FIG. 4. Two outputs 24a and 24b of the peak clipping circuit 10 are added at a signal combining circuit 26, the output of which is applied to the subsequent stage that is generally illustrated by a phantom block 28.

Another modulators 30a–30n, each of which is configured in exactly the same manner as mentioned above, are provided such as to be respectively assigned to other subscribers. In FIG. 3, there are shown signal combining circuits 31a–31n which are respectively provided in the modulators 30a–30n.

The outputs of the signal combining circuits 26, and 31a–31n are subjected to "spread spectrum" operations within the above-mentioned subsequent stage 28. More specifically, each of the outputs of the combining circuits 26 and 31a–31n is multiplied by the corresponding pseudorandom (psuedonoise or PN) sequences, as is well known in the art. Subsequently, the signals outputted from the stage 28 are multiplexed and amplified at a power amplifier 32 to a suitable level and then radiated from an antenna 34.

A controller (not shown), such as a CPU (central processing unit), always watches the number of multiplexed signals before being applied to the power amplifier 32. The controller generates a peak clipping level control signal 36, the level of which is adaptively changed so as to properly limit the levels of the above mentioned I and Q signals depending on the number of multiplexed signals. Although not shown in FIG. 3, each of the other modulators 30a–30n is also supplied with the aforesaid control signal 36.

Figure 4:
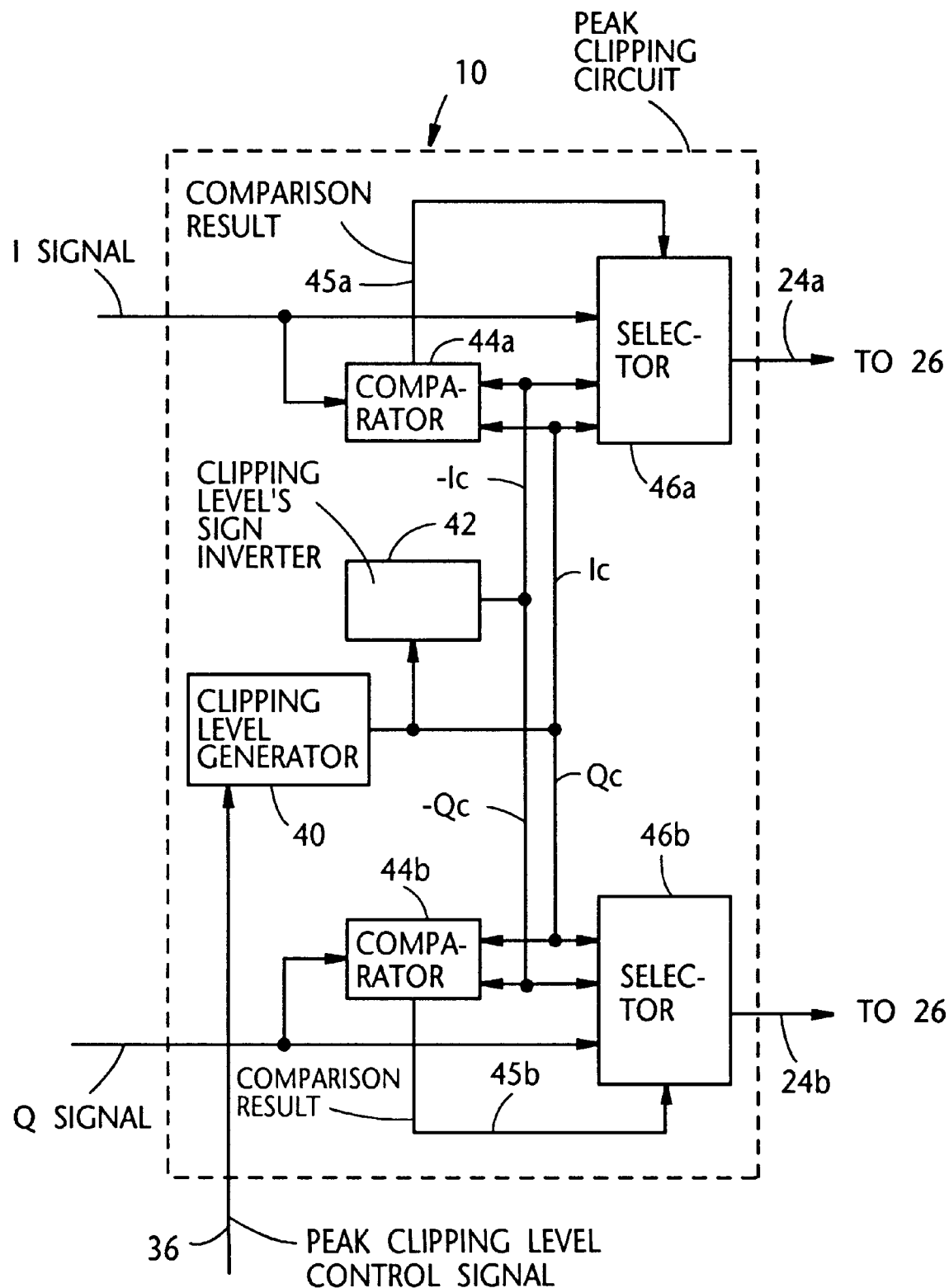
FIG. 4 is a block diagram showing the detail of the peak clipping circuit of FIG. 3.

FIG. 4 is a block diagram showing the peak clipping circuit 10 in detail, which is comprised of a clipping level generator 40, an inverter 42 for inverting a sign of the output of the generator 40, two comparators 44a–44b, and two signal selectors 46a–46b. The clipping level generator 40 generates a clipping level signal 41, the magnitude of which is controlled by the peak clipping level control signal 36. For the sake of convenience of describing the operation of the circuit 10, the clipping level is denoted by Ic and Qc which are respectively applied to the blocks 44a–46a and 44b–46b. In a similar manner, the output of the inverter 42 is denoted by –Ic and –Qc which are respectively applied to the blocks 44a–46a and 44b–46b. The clipping level Ic (or Qc) is represented by a suitable bit length which is identical with the bit length of each of the I and Q signals. The comparator 44a compares the level of the I signal outputted from the multiplier 18a with the clipping levels Ic and –Ic, and outputs a comparison result signal 45a. The selector 46a responds to the comparison result signal 45a and selects one of the I signal and the clipping levels Ic and –Ic.

That is, in the case where the I signal has a level which is between the clipping levels Ic and –Ic, the selector 46a allows the I signal to pass therethrough. On the other hand, when the level of the I signal exceeds the clipping level Ic, the selector 46a selects the clipping level Ic and applies it to the signal combining circuit 26. On the contrary, when the level of the I signal is blow the clipping level –Ic, the selector 46a selects this clipping level –Ic and applies it to the signal combining circuit 26. This operation can be expressed in a manner different from the above. That is, when the absolute value of the I signal's level does not reach the clipping level Ic, the selector 46a selects the I signal itself. On the other hand, when the absolute value of the I signal's level exceeds the clipping level Ic, the selector 46a outputs the clipping level Ic after adding thereto the sign which is identical with the I signal in question. The same discussion holds in connection with the Q signal and thus, the above description does not iterate for simplifying the disclosure.

Figure 5:
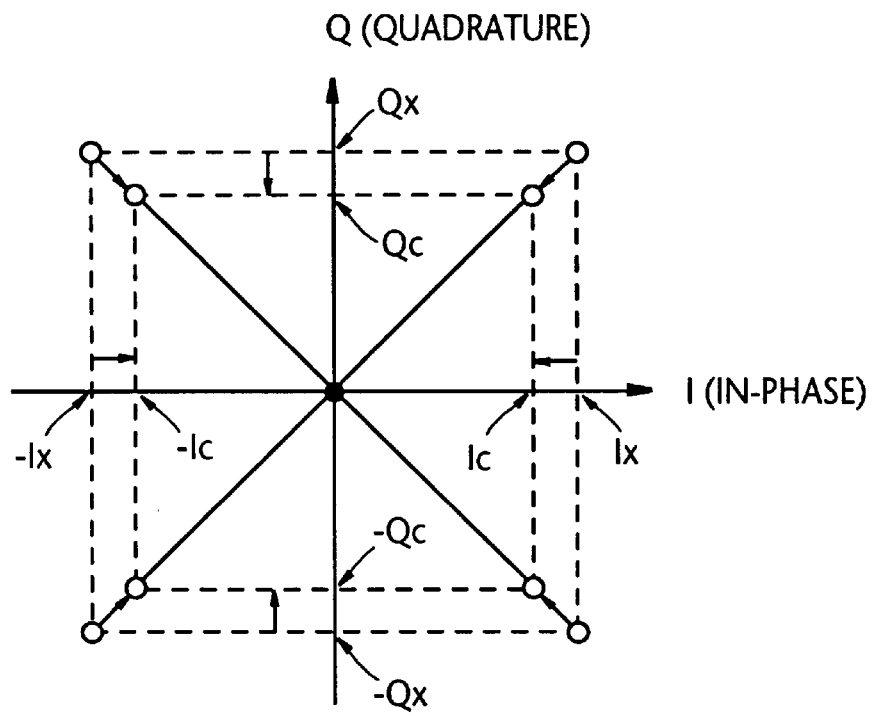
FIG. 5 is a signal space diagram of QPSK for describing the operation of the peak clipping circuit of FIG. 3.

Referring to FIG. 5, the operation of the peak clipping circuit 10 will further be described in connection with a signal space diagram of QPSK. The clipping levels Ic, –Ic, Qc, and –Qc, which has been referred to in FIG. 4, are plotted on the I and Q axes. When the I signal inputted to the peak clipping circuit 10 has a level indicated by Ix in excess of the clipping level Ic, the selector 46a (FIG. 4) selects the level Ic and applies it to the signal combining circuit 26. That is, in this case, the peak level of the I signal is clipped to Ic. In a similar manner, when the Q signal inputted to the peak clipping circuit 10 has a level indicated by –Ix lower than the clipping level –Ic, the selector 46a (FIG. 4) selects the level Ic and applies it to the signal combining circuit 26. It is understood that the above operations are also applicable to the case of Binary-PSK.

Figure 6:
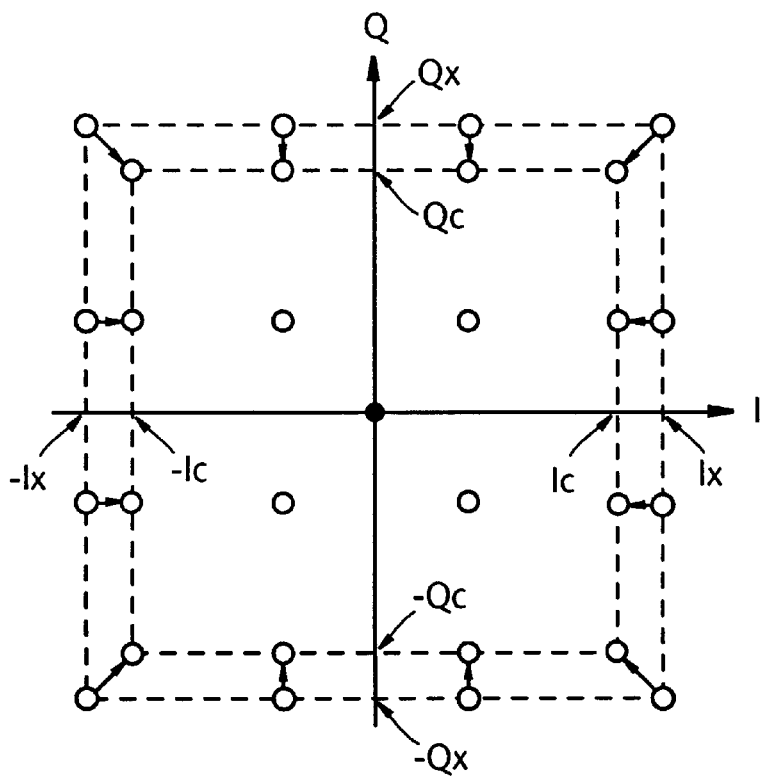
FIG. 6 is a signal diagram of 16-QAM for describing the operation of the present invention.

FIG. 6 is a signal space diagram of 16-PSK given for illustrating the other case to which the present invention is applicable. As shown, each peak level of the outermost I and Q signals can be clipped when the peak level exceeds or below the clipping level (viz., Ic, −Ic, Qc, and −Qc). From the foregoing, the application of the present invention to 16-PSK will be clearly understood and thus, further description thereof will be omitted for brevity.

It will be understood that the above disclosure is representative of some possible embodiments of the present invention and that the concept on which the invention is base is not specifically limited thereto.

What is claimed is:

1. A peak clipping circuit provided in a modulator of a signal transmitter, said peak clipping circuit limiting a level of an incoming in-phase signal and a level of an incoming quadrature signal, comprising:
   a clipping level generator for generating a clipping level;
   an inverter, coupled to receive said clipping level, for generating an inverted clipping level;
   a first comparator receiving said in-phase signal, said clipping level, and said inverted clipping level, said first comparator comparing a level of said in-phase signal with each of said clipping level and said inverted clipping level, and generating a first comparison result;
   a second comparator receiving said quadrature signal, said clipping level, and said inverted clipping level, said second comparator comparing a level of said quadrature signal with each of levels of said clipping level and said inverted clipping level, and generating a second comparison result; and
   signal selecting means for responding to said first comparison result and selecting one of said in-phase signal, said clipping level, and said inverted clipping level and for responding to said second comparison result and selecting one of said quadrature signal, said clipping level, and said inverted clipping level.

2. A peak clipping circuit as claimed in claim 1, wherein said signal selecting means comprises:
   a first selector, in response to said first comparison result, allowing said in-phase signal to pass therethrough when the level of said in-phase signal exceeds said inverted clipping level and less than said clipping level, selecting said inverted clipping level when the level of said in-phase signal is less than said inverted clipping level, and selecting said clipping level when the level of said in-phase signal exceeds the clipping level; and
   a second selector, in response to said second comparison result, allowing said quadrature to pass therethrough when the level of said quadrature signal exceeds said inverted clipping level and less than said clipping level, selecting said inverted clipping level when the level of said quadrature signal is less than said inverted clipping level, and selecting said clipping level when the level of said quadrature signal exceeds the clipping level.

3. A peak clipping circuit as claimed in claim 2, wherein said transmitter is configured such as to combine a plurality of data and transmitting the combined data, and wherein said clipping level is controlled depending on a number of data to be transmitted.

4. A peak clipping circuit as claimed in claim 2, wherein said modulator comprises a BPSK (binary phase shift keying) modulator.

5. A peak clipping circuit as claimed in claim 2, wherein said modulator comprises a QPSK (quadrature phase shift keying) modulator.

6. A peak clipping circuit as claimed in claim 1, wherein said signal selecting means comprises:
   a first selector, in response to said first comparison result, allowing said in-phase signal to pass therethrough when an absolute level of said in-phase signal does not exceed the clipping level, and selecting the clipping level after adding thereto a sign which is identical with a signal of said in-phase signal when the absolute level of said in-phase signal exceeds said clipping level; and
   a second selector, in response to said second comparison result, allowing said quadrature signal to pass therethrough when an absolute level of said quadrature signal does not exceed the clipping level, and selecting the clipping level after adding thereto a sign which is identical with a sign of said quadrature signal when the absolute level of said quadrature signal exceeds said clipping level.

7. A peak clipping circuit as claimed in claim 6, wherein said transmitter is configured such as to combine a plurality of data and transmitting the combined data, and wherein said clipping level is controlled depending on a number of data to be transmitted.

8. A peak clipping circuit as claimed in claim 6, wherein said modulator comprises a BPSK (binary phase shift keying) modulator.

9. A peak clipping circuit as claimed in claim 6, wherein said modulator comprises a QPSK (quadrature phase shift keying) modulator.

10. A peak clipping circuit as claimed in claim 1, wherein said transmitter is configured such as to combine a plurality of data and transmitting the combined data, and wherein said clipping level is controlled depending on a number of data to be transmitted.

11. A peak clipping circuit as claimed in claim 10, wherein said modulator comprises a BPSK (binary phase shift keying) modulator.

12. A peak clipping circuit as claimed in claim 10, wherein said modulator comprises a QPSK (quadrature phase shift keying) modulator.

13. A peak clipping circuit as claimed in claim 1, wherein said modulator comprises a BPSK (binary phase shift keying) modulator.

14. A peak clipping circuit as claimed in claim 1, wherein said modulator comprises a QPSK (quadrature phase shift keying) modulator.

15. A method of clipping a level of an incoming in-phase signal and a level of an incoming quadrature signal in a modulator of a signal transmitter, comprising the steps of:
   generating a clipping level;
   receiving said clipping level and generating an inverted clipping level;
   comparing a level of said in-phase signal with said clipping level and said inverted clipping level, and generating a comparison result;
   selecting, in response to said comparison result, said in-phase signal when an absolute level of said in-phase signal does not exceed said clipping level, and selecting said clipping level after adding thereto a sign which is identical with said in-phase signal when the absolute level of said in-phase signal exceeds said clipping level;
   comparing a level of said quadrature signal with said clipping level and said inverted clipping level, and generating a comparison result; and
   selecting, in response to said comparison result, said quadrature signal when an absolute level of said quadrature signal does not exceed the clipping level, and selecting the clipping level after adding thereto a sign which is identical with said quadrature signal when the absolute level of said quadrature signal exceeds said clipping level.

16. A method as claimed in claim 15, wherein said transmitter is configured such as to combine a plurality of data and transmitting the combined data, and wherein said clipping level is controlled depending on a number of data to be transmitted.

17. A method as claimed in claim 15, wherein said modulator comprises a BPSK (binary phase shift keying) modulator.

18. A method as claimed in claim 15, wherein said modulator comprises a QPSK (quadrature phase shift keying) modulator.

* * * * *